(12) United States Patent
Swift (10) Patent No.: US 9,607,453 B2
(45) Date of Patent: Mar. 28, 2017

(54) DYNAMIC INDUSTRIAL VEHICLE MEASURE

(71) Applicant: Crown Equipment Corporation, New Bremen, OH (US)

(72) Inventor: Philip W. Swift, Oakwood, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 14/852,752

(22) Filed: Sep. 14, 2015

(65) Prior Publication Data
US 2016/0078694 A1 Mar. 17, 2016

Related U.S. Application Data

(60) Provisional application No. 62/050,157, filed on Sep. 14, 2014.

(51) Int. Cl.
*G05B 15/02* (2006.01)
*G01C 21/00* (2006.01)
(Continued)

(52) U.S. Cl.
CPC .......... *G07C 5/0808* (2013.01); *G05B 15/02* (2013.01); *G06Q 10/06393* (2013.01); *G07C 5/085* (2013.01)

(58) Field of Classification Search
CPC ............... G05B 15/02; G06Q 30/0224; G06Q 10/06395; G06Q 30/08; G06T 7/0018; G08G 1/0967; G08G 5/0039; B60C 23/0401; B60W 10/06; H04W 48/04; G01C 21/00; E02F 9/085; H04L 67/125
(Continued)

(56) References Cited

U.S. PATENT DOCUMENTS 5,011,184 A * 4/1991 Loudon ................... E02F 9/085
254/423
8,843,303 B1 * 9/2014 Young .................. G08G 5/0039
701/122

(Continued)

FOREIGN PATENT DOCUMENTS

WO 2011019872 A2 2/2011
WO 2011036495 A2 3/2011
WO 2014144240 A1 9/2014

OTHER PUBLICATIONS

Nathalie Abadie; The International Search Report and the Written Opinion of the International Searching Authority; International Application No. PCT/US2015/049925; Nov. 11, 2015; European Patent Office; Rijswijk, The Netherlands.

*Primary Examiner* — Yuri Kan
(74) *Attorney, Agent, or Firm* — Stevens & Showalter, LLP (57) ABSTRACT

A task to be performed using an industrial vehicle is defined and segmented into segments including a start segment and an end segment. The performance of the industrial vehicle while the industrial vehicle performs the segments is measured, and a target score for the task based on an extrinsic factor that is in effect at least one time during performance of the task is defined. The measured performance of the industrial vehicle during the segments is aggregated to create a task performance score, which is evaluated to the target score to create a task evaluation.

23 Claims, 5 Drawing Sheets

(51) Int. Cl.
*G07C 5/08* (2006.01)
*G06Q 10/06* (2012.01)

(58) Field of Classification Search
USPC .......... 701/34.2, 93, 41, 468, 29.4, 122, 22;
705/4, 7.39; 348/148; 340/901, 447;
280/766.1
See application file for complete search history.

(56) References Cited

U.S. PATENT DOCUMENTS

| | | | |
|---|---|---|---|
| 9,288,270 B1* | 3/2016 | Penilla | H04L 67/125 |
| 2005/0131597 A1 | 6/2005 | Raz et al. | |
| 2010/0131307 A1* | 5/2010 | Collopy | G06Q 30/0224 |
| | | | 705/4 |
| 2011/0040440 A1 | 2/2011 | de Oliveira et al. | |
| 2012/0136527 A1* | 5/2012 | McQuade | G06Q 30/08 |
| | | | 701/29.4 |
| 2013/0002871 A1* | 1/2013 | Natroshvili | G06T 7/0018 |
| | | | 348/148 |
| 2014/0046585 A1* | 2/2014 | Morris, IV | G01C 21/00 |
| | | | 701/468 |
| 2014/0188576 A1* | 7/2014 | de Oliveira | G06Q 10/06395 |
| | | | 705/7.39 |
| 2014/0309886 A1* | 10/2014 | Ricci | H04W 48/04 |
| | | | 701/41 |
| 2015/0012202 A1* | 1/2015 | Moore | B60W 10/06 |
| | | | 701/93 |
| 2015/0109145 A1* | 4/2015 | Marathe | G08G 1/0967 |
| | | | 340/901 |
| 2016/0075193 A1* | 3/2016 | Huang | B60C 23/0401 |
| | | | 340/447 |

\* cited by examiner

DYNAMIC INDUSTRIAL VEHICLE MEASURE

CROSS REFERENCE TO RELATED APPLICATIONS

This application claims the benefit of U.S. Provisional Patent Application Ser. No. 62/050,157, filed Sep. 14, 2014, entitled DYNAMIC INDUSTRIAL VEHICLE MEASURE, the disclosure of which is hereby incorporated by reference.

BACKGROUND

The present disclosure relates in general to improvements in the technology of industrial vehicles based upon the measurement of industrial vehicle usage, and in particular, to the dynamic measurement and assessment of industrial vehicle performance based upon usage.

Wireless strategies may be deployed by business operations, including distributors, retail stores, manufacturers, etc., to improve the efficiency and accuracy of business operations. Wireless strategies may also be deployed by such business operations to avoid the insidious effects of constantly increasing labor and logistics costs. In a typical wireless implementation, workers are linked to a management system executing on a corresponding computer enterprise via a mobile wireless transceiver. The wireless transceiver may be used as an interface to the management system to direct workers in their tasks (e.g., by instructing workers where and/or how to pick, pack, put away, move, stage, process, or otherwise manipulate the items within the operator's facility). The wireless transceiver may also be used in conjunction with a suitable input device to scan, sense or otherwise read tags, labels or other identifiers to track the movement of designated items within the facility.

In order to move items about the operator's facility, workers often utilize industrial vehicles, including for example, forklift trucks, hand and motor driven pallet trucks, etc. However, disruptions in the operation of such industrial vehicles impact the ability of the management system and corresponding wireless strategy to obtain peak operating efficiency.

BRIEF SUMMARY

According to aspects of the present disclosure, a computer-implemented method is provided, which is used for evaluating the performance of an industrial vehicle. The method comprises receiving into memory, information designating a task to be performed using an industrial vehicle. In this manner, the task is divided into segments. Also, the task has metrics associated therewith. The metrics correlate measurable parameters on the industrial vehicle to actions associated with the defined task. As such, the industrial vehicle knows how to measure performance against the task. The method also comprises measuring performance of the industrial vehicle during execution of the segments of the task, based upon the metrics associated with the task. The measurement of industrial vehicle performance is carried out by extracting vehicle operational data (e.g., energy usage, travel speed, travel distance, lift weight, etc.) that is generated on the industrial vehicle in response to the industrial vehicle executing the segments of the task, where the extracted vehicle operational data is responsive to at least one metric.

Yet further, the method comprises receiving into memory, information identifying an extrinsic factor (which may be external to the industrial vehicle), where the extrinsic factor is in effect at least one time during performance of the task. Here, the extrinsic factor is capable of impacting a performance capability of the industrial vehicle in performing the task. The method still further comprises computing a target score for the task based on the extrinsic factor, and generating a task performance score based upon the measured performance of the industrial vehicle in performing the task. Still further, the method comprises evaluating the task performance score against the target score for the task to create a task evaluation, the task evaluation indicative of industrial vehicle performance.

In this regard, the target score is "dynamic". More particularly, the target score is based on an extrinsic factor that is in effect at least one time during performance of the task. For example, the target score for the task can take into account environmental conditions, such as an observation that the vehicle operator had to navigate through a congested area of warehouse, or stop at the end of an aisle due to warehouse policy. The target score can also factor in specific information about the industrial vehicle itself, such as specific limitations or capabilities related to travel speed, lift height, whether there are semi-automation features installed on the vehicle, etc. Still further, the target score can factor in real-time vehicle information in effect during performance of the task, such as the state of charge on the battery, whether any vehicle functions are intentionally being restricted or limited due to performance tuning, etc.

According to yet further aspects of the present disclosure, a computer-implemented method of evaluating the performance of an industrial vehicle is provided. The method comprises receiving into memory, information designating a task to be performed using an industrial vehicle. In this manner, the task has metrics associated therewith. The method also comprises measuring performance of the industrial vehicle during execution of the task based upon the metrics associated with the task to create a task performance score. Industrial vehicle performance is measured by extracting vehicle operational data that is generated on the industrial vehicle in response to the industrial vehicle executing the task, where the extracted vehicle operational data is responsive to at least one metric.

The method still further comprises receiving into memory, information identifying an extrinsic factor that is in effect at least one time during performance of the task. The extrinsic factor designates a factor not related to the performance capability of the industrial vehicle. The method yet further comprises computing a target score for the task based on the extrinsic factor that is in effect at least one time during performance of the task, and evaluating the task performance score against the target score for the task to create a task evaluation.

DETAILED DESCRIPTION

According to various aspects of the present disclosure, approaches are provided to dynamically assess performance data measured during the operation of industrial vehicles. The approaches herein can be used to translate industrial vehicle performance data across operating facilities (e.g., warehouses), enterprise operations, industries, etc., by providing a dynamically adjusted measure that is vehicle specific. As such, the approaches herein are useful in evaluating industrial vehicles, including those industrial vehicles from different manufacturers, makes, models, etc. Accordingly, the technological field of industrial vehicle performance and capability is improved.

More particularly, operations performed by an industrial vehicle are broken down into tasks. Those tasks can be further broken down into segments. Vehicle performance data is collected during the execution of each task (or each task segment). The collected vehicle performance data is transformed into a task performance score. Depending upon desired granularity, the performance score can be broken down for each task, and even for each segment. Moreover, the task performance score is compared against a corresponding target score for completing the task. Here, the target score is dynamically adjusted to account for extrinsic factors that are unique to the particular implementation and/or instance of the associated task.

System Architecture

Aspects of the present disclosure comprise systems that enable industrial vehicles to wirelessly communicate with an application deployed in an enterprise computing environment. Exemplary industrial vehicles include materials handling vehicles, such as forklift trucks, reach trucks, turret trucks, walkie stacker trucks, tow tractors, hand operated pallet trucks, etc.

Figure 1:
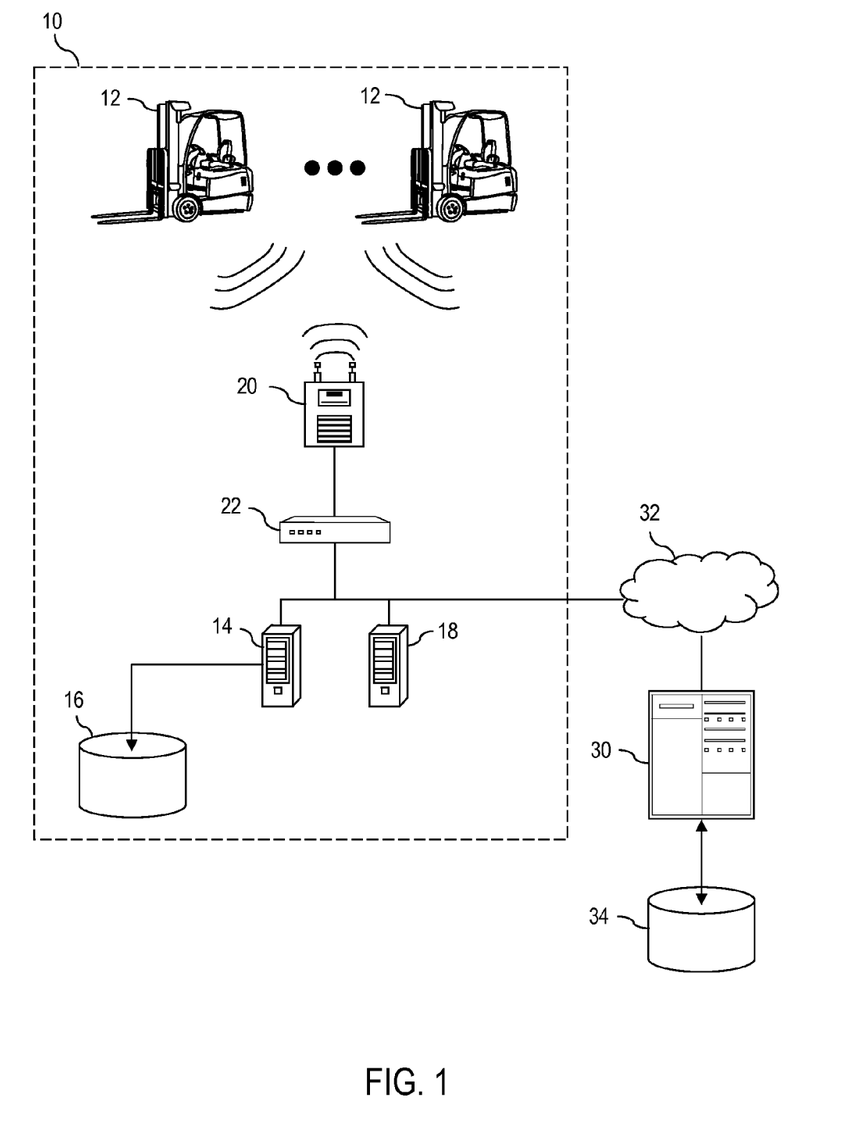
FIG. 1 is a schematic of an illustrative operating environment in which the disclosure herein can be practiced.

Referring now to the drawings and particularly to FIG. 1, an exemplary computing environment 10 is illustrated, which includes components that support wireless communication capabilities. Industrial vehicles 12, such as materials handling vehicles (shown as forklift trucks for convenience of illustration), each include a communications device that enables that industrial vehicle 12 to wirelessly communicate with a processing device, such as an industrial vehicle application server 14. The industrial vehicle application server 14 can further interact with a data resource 16 (e.g., one or more databases, data stores, or other sources of information) to facilitate interaction with the industrial vehicles 12 as will be described in greater detail herein.

The illustrated computing environment 10 further supports additional processing devices 18, which comprise for example, servers, personal computers, etc. One or more of the processing devices 18 also communicate with the industrial vehicles 12 and/or the industrial vehicle application server 14 across the computing environment 10.

The wireless communication architecture can be based upon a standard wireless fidelity (WiFi) infrastructure, e.g., standard 802.11.xx. However, any other suitable protocol can alternatively be implemented. In an exemplary WiFi implementation, one or more wireless access points 20 can be utilized to relay data between a wireless transceiver of each industrial vehicle 12 and one or more wired devices of the computing environment 10 (e.g., the industrial vehicle application server 14).

In the illustrative example, the computing environment 10 is supported by one or more hubs and/or other networking components 22 that interconnect the various hardware and/or software processing devices, including for example, routers, firewalls, network interfaces and corresponding interconnections. The particular networking components provided in the computing environment 10 can thus be selected to support one or more intranets, extranets, local area networks (LAN), wide area networks (WAN), wireless networks (WiFi), the Internet, including the world wide web, and/or other arrangements for enabling communication across the computing environment 10, either real time or otherwise (e.g., via time shifting, batch processing, etc.).

Also, in the illustrative example, one or more computing devices optionally further communicate with a remote server 30 across a network 32, such as the Internet. The remote server 30 can comprise, for example, a third party server (e.g., operated by the industrial vehicle manufacturer) that interacts with the industrial vehicles 12, the industrial vehicle application server 14 and/or other processing devices 18 of the computing environment(s) 10. The remote server 30 can further interact with a data resource 34, e.g., one or more databases, data stores or other sources of information.

Industrial Vehicle Data Collection

Figure 2:
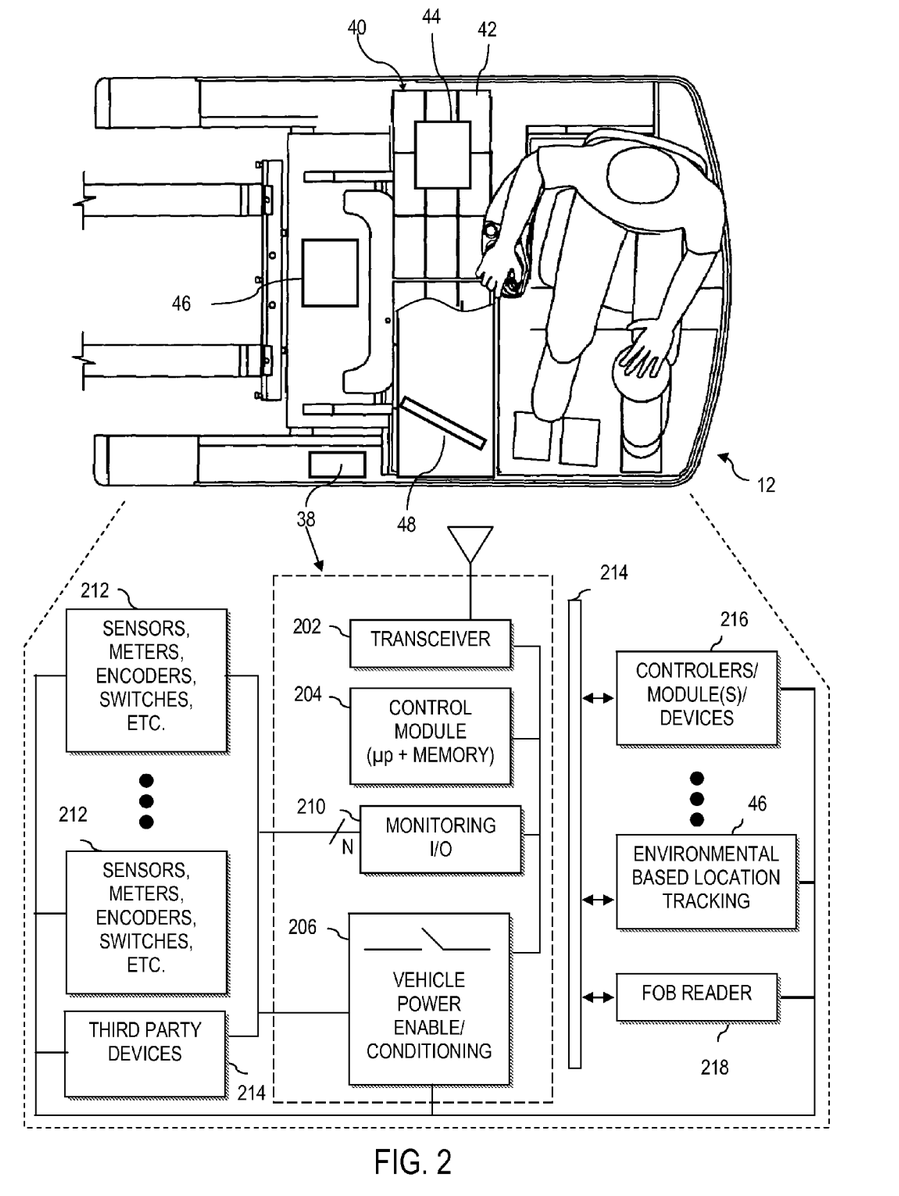
FIG. 2 is a view of an operator in an industrial vehicle having a battery, a battery management system, an information linking device for wirelessly communicating with a computing environment, and environmental based location tracking, according to aspects of the present disclosure.

Referring to FIG. 2, an industrial vehicle 12 includes conventional features such as forks, an operator compartment, etc. The specific features of the industrial vehicle 12 will vary depending upon the style of vehicle as is well known in the art.

Additionally, the industrial vehicle 12 includes a communication device referred to herein as an information linking device 38. The information linking device 38 is utilized to receive data from sensors, encoders, controllers and other electronics of the industrial vehicle 12. The information linking device 38 is also used to communicate information with control modules, displays, and other electronics of the industrial vehicle 12. The information linking device 38, the industrial vehicle 12, and the corresponding computer environment (e.g., as described with reference to FIG. 1) can incorporate any of the features and structures as set out in U.S. Pat. No. 8,060,400 to Wellman, entitled "Fleet Management System," the disclosure of which is herein incorporated by reference in its entirety.

In an example implementation, the industrial vehicle 12 also includes a battery 40 comprised of a plurality of battery cells 42 and an optional battery monitor 44. The battery monitor 44 includes a processor in data communication with memory, to implement battery monitoring, battery data logging, and for implementing methods and processes as set out herein, etc. For instance, in an example implementation, the battery monitor 44 is utilized for the monitoring of battery characteristics (e.g., one or more of current, voltage, resistance, temperature, water level, etc.) to determine energy usage during measured/monitored tasks. In this regard, the battery monitor 44 interfaces with various sensors, such as a current sensor, one or more temperature sensors, a water level sensor, voltage sensor, etc., to sample battery characteristics of interest. In an example configuration, the results of battery monitoring are stored on the battery monitor itself. In alternative configurations, data samples of the battery monitoring state are communicated to the information linking device 38 for processing, storage, forwarding to the information server 14, etc. In still further alternative implementations, data samples of the battery monitoring state are forwarded to the information server 14, e.g., via the information linking device 38.

The battery monitor 44, where provided, can communicate with the information linking device 38 via direct wired connection, via a wireless connection (such as Bluetooth, etc.), via a vehicle network bus (e.g., a Control Area Network (CAN) bus, Zigbee bus, or other local vehicle scheme) etc. The battery monitor 44 can also communicate directly with the industrial vehicle application server 14 or other remote device.

In the example illustrated in FIG. 2, the industrial vehicle 12 also comprises a environmental based location tracking device 46, which communicates with the information linking device 38 via a suitable communication capability, e.g., direct wired connection, via a wireless connection (such as Bluetooth, etc.), via a vehicle network bus, etc. The environmental based location tracking device 46 is used to facilitate environmental localization, tracking, mapping, etc. In this regard, the environmental based location tracking device 46 provides position information of the corresponding industrial vehicle, position information of objects in the environment of the industrial vehicle (e.g., using proximity sensors) or both. Environmental tracking can be localized, e.g., relative to the industrial vehicle, or fixed global positioning, e.g., relative to a warehouse or other location of operation.

The environmental based location tracking device 46 interfaces with or otherwise integrates various sensors, such as proximity sensors (e.g., ultrasonic, laser, etc.), cameras, gyroscopes, accelerometers, etc. Sensors can be used for detecting location based upon markers in the floor, ceiling, racks or elsewhere. For instance, an example environmental based location tracking device 46 includes or otherwise interacts with a radio frequency identification (RFID) reader, which can be used to read RFID pills buried in the floor or positioned elsewhere in the warehouse. In another example, the environmental based location tracking device 46 uses markers, such as fixed position features of the environment for localization. The environmental based location tracking device 46 can also use measured vehicle information such as speed, heading, wheel slip, etc., to correct, compensate, validate, or otherwise enhance sensor measurements.

Location information is determined, computed, evaluated, stored, etc., within the environmental based location tracking device 46 itself. In alternative configurations, the collected data is communicated to the information linking device 38 for processing, storage, forwarding to the information server 14, etc. In still further alternative implementations, the results and/or data can be forwarded directly to the information server 14, etc. Here, the information server 14 is used to process the data and return results to the industrial vehicle 12.

By including the environmental based location tracking device 46 in communication with the information linking device 38, the location of the industrial vehicle 12 is tracked and optionally mapped, even indoors in environments such as warehouses. As such, a server that receives the location based vehicle information can determine where in the environment the industrial vehicle 12 is in near real time (real time for effective purposes). Where all vehicles (and optionally other equipment, objects, pedestrians, etc.) include environmental based location tracking devices 46 (or can otherwise be tracked), the industrial vehicles 12, industrial vehicle application server 14, or combination thereof, can determine whether there is congestion, heavy or light traffic, etc.

The industrial vehicle application server 14 can also know other operations-specific information. For instance, a database can store coordinates or other defining information along with one or more rules associated with the location identified by the coordinates. By way of example, a set of coordinates define an end of an aisle. A rule stored with the coordinates indicate that industrial vehicles are supposed to stop before continuing through/past the end of the aisle. As another example, a series of coordinates define a geofence location, along with rules that identify which vehicles, operators, etc., are allowed (or specifically are not allowed) within the geofenced location. As yet another example, coordinates are defined along with rules that specify speed restricted locations (e.g., an area with high pedestrian traffic) such as a lane outside a break room, etc.

The industrial vehicle 12 further includes a display 48, which is utilized to present information to the vehicle operator, including information regarding an evaluation of the performance of the industrial vehicle computed in a manner as will be described in greater detail herein. Moreover, in an example implementation, the information linking device 38 can include a display, a transceiver for wireless communication (e.g., with the application server 14, other remote devices, etc.), I/O, a processor in data communication with memory for storing collected data about the corresponding industrial vehicle and/or for implementing methods and processes as set out herein, etc.

As will be described in greater detail herein, this ability allows the information linking device 38 to collect, aggregate, compute or otherwise derive performance data of the industrial vehicle.

By way of example, the information linking device 38 and industrial vehicle electronics are illustrated within the breakout dashed box, indicating that these features are contained within the industrial vehicle 12.

More particularly, as illustrated in the example implementation, the information linking device 38 is implemented as a special purpose, particular computer, such as a device that mounts to or is otherwise integrated with the industrial vehicle 12. The information linking device 38 includes a processor coupled to memory to carry out instructions. However, the execution environment of the information linking device 38 is further tied into the industrial vehicle 12 making it a particular machine different from a general purpose computer.

The illustrated information linking device 38 is implemented as an information linking device that comprises the necessary circuitry to implement wireless communication, data and information processing, and wired (and optionally wireless) communication to components of the industrial vehicle. As a few illustrative examples, the information linking device 38 includes (or is otherwise in data communication with) a transceiver 202 for wireless communication. Although a single transceiver 202 is illustrated for convenience, in practice, one or more wireless communication technologies can be provided. For instance, in an example implementation, the transceiver 202 is able to communicate with a remote server, e.g., server 112 of FIG. 1, via 802.11.xx across the access points 110 of FIG. 1. In a further example, the transceiver 202 also optionally supports other wireless communication, such as cellular, Bluetooth, infrared (IR) or any other technology or combination of technologies. For instance, using a cellular to IP bridge, the transceiver 202 can use a cellular signal to communicate directly with a remote server, e.g., a manufacturer server (server 30, FIG. 1). Moreover, using Bluetooth, the information linking device 38 communicates with the battery monitor 44.

The information linking device 38 also comprises a control module 204, having a processor coupled to memory for implementing computer instructions, including the relevant methods, processes, or aspects thereof, as set out and described more fully herein. Additionally, the control module 204 implements processes such as operator log on, pre-use inspection checklists, data monitoring and other features, examples of which are described more fully in U.S. Pat. No. 8,060,400 to Wellman, already incorporated by reference herein.

The information linking device 38 further includes vehicle power enabling circuitry 206 to selectively enable or disable the industrial vehicle 12 and/or selectively enable or disable select components of the industrial vehicle 12. In certain implementations, the vehicle power enabling circuitry 206 can partially enable the industrial vehicle for operation, or fully enable the industrial vehicle for operation, e.g., depending upon proper operator login. For instance, the industrial vehicle power enabling circuitry 206 can provide selective power to components via a power connection to the battery 40.

Still further, the information linking device 38 includes a monitoring input output (I/O) module 210 to communicate via wired or wireless connection to peripheral devices mounted to or otherwise on the industrial vehicle, such as sensors, meters, encoders, switches, etc. (collectively represented by reference numeral 212). Peripheral devices 212 can also include graphics displays (e.g., that support a graphical user interface), keypads, input/output devices, etc., that interact or control elements in the graphical user interface of the display. The communication device can also be connected to other devices, e.g., third party devices 214 such as RFID scanners, displays, meters or other devices.

The information linking device 38 is coupled to and/or communicates with other industrial vehicle system components via a suitable industrial vehicle network system 214, e.g., a vehicle network bus. The industrial vehicle network system 214 is any wired or wireless network, bus or other communications capability that allows electronic components of the industrial vehicle 12 to communicate with each other. As an example, the industrial vehicle network system can comprise a controller area network (CAN) bus, ZigBee, Bluetooth, Local Interconnect Network (LIN), time-triggered data-bus protocol (TTP) or other suitable communication strategy. Utilization of the industrial vehicle network system enables seamless integration of the information linking device 38 into the native electronics of the industrial vehicle 12, including controllers, encoders, processors, sensors, electronics peripherals and other electronics of the industrial vehicle 12.

Utilization of the industrial vehicle network system 214 enables seamless integration of the components (202, 204, 206, 208) of the information linking device 38 into the native electronics of the industrial vehicle 12, including controllers of the industrial vehicle 12 and optionally, any electronic peripheral devices 212 associated with the industrial vehicle 12 (e.g., via the monitoring I/O 210) that integrate with and can communicate over the network system. For instance, in an example implementation, the information linking device 38 connects with, understands and is capable of communication with native vehicle components, such as controllers, modules, devices, bus enabled sensors, displays, lights, etc. (collectively referred to by reference 216). The communication device can also communicate with a FOB 218 (or keypad, card reader or any other device) for receiving operator log in identification.

According to yet further aspects of the present disclosure, the environmental based location tracking device 46 is illustrated as communicating with the information linking device 38 across a vehicle network bus, e.g., the industrial vehicle network system 214. The environmental based location tracking device 46 enables the industrial vehicle 12 to be spatially aware of its location within a local space, e.g., within a warehouse. Conventional global positioning systems (GPS) are not always effective, especially in contained indoor environments such as warehouses and other indoor facilities. As such, the environmental based location tracking device 46 can comprise a local awareness system that utilizes markers, including RFID, beacons, lights, or other external devices to allow spatial awareness within the warehouse environment, as noted above.

The environmental based location tracking device 46 can also use a triangulation system, knowledge read from vehicle sensors, encoders, accelerometers, etc., or other system that allows location to be determined, augmented, corrected, modified, etc. Yet further, the environmental based location tracking device 46 can use combinations of the above and/or other technologies to determine the current (real-time) position of the industrial vehicle within a local environment (e.g., warehouse). As such, the position of the industrial vehicle can be continuously ascertained (e.g., every second or less) in certain implementations. Alternatively, other sampling intervals can be derived to continuously (e.g., at discrete defined time intervals, periodic or otherwise constant and recurring time intervals, intervals based upon interrupts, triggers or other measures) determine industrial vehicle position over time. As such, it is sufficient to know absolute position within a local bounded environment (e.g., within a warehouse, building, etc.) without the need to know absolute global position.

Tasks

A task to be performed by an industrial vehicle is defined. For example, a task can be defined as moving a load from a source to a destination. In operation, an industrial vehicle (e.g., the industrial vehicle 12 of FIG. 2) moving a pallet of goods from a specified rack location in a warehouse to a loading dock of the warehouse, executes an action corresponding to an example of a defined task.

As a few illustrative examples, a task can be defined as a pick operation wherein the industrial vehicle must maneuver from a start location to a predetermined bin location and retrieve a load. A task can also be defined as a put-away operation wherein the industrial vehicle must maneuver a load from a start location (e.g., a receiving lane) to an end location (e.g., a predetermined bin) to place a load.

In practice, many tasks will likely be defined. Moreover, select metrics are associated with each task. In this regard, tasks are defined so as to account for the operations executed by an industrial vehicle during normal use, e.g., tasks that the industrial vehicle is called upon to execute during an operating shift. The task can be defined at any location (e.g., at a server such as the industrial vehicle application server 14, at the industrial vehicle 12, etc.).

A task is optionally segmented into one or more segments. The segmentation process is used to divide a given task into the granularity required for a specific application. In this regard, metrics can be associated to a task that are specific to a corresponding segment. As such, tasks can be defined in a manner that is coarse, fine, or intermediate. Correspondingly, each task can be broken down into segments, which themselves can be broken down into finer segments, as the application dictates. This logic can continue to derive a hierarchy as desired for a given application.

For instance, take a task such as "moving a load from a specified start location to a specified end location". In a first example implementation, this task is represented as a single segment, i.e., moving a load from a specified start location to a specified end location. A corresponding metric is to measure time, distance traveled, energy consumed, a combination thereof, or other parameters as the specific application dictates. Alternatively, in a second example, the task is broken down into a start segment and an end segment, with zero or more intermediate segments. For instance, in an example implementation, a start segment is defined as a "pick up the load" (this segment metric can include a measure of time, energy, detected weight, location, a combination thereof, etc.), an intermediate segment can be "travel to end location" (this segment metric can include a measure of time, distance, load carried, a combination thereof, etc.,) and an end segment is defined as "place load" (this segment metric can include a measure of time, energy, detected weight, location, a combination thereof, etc.).

There can be multiple, discrete, sequential, non-overlapping segments that span the task. As an example using the above-task, the task is segmented into a start segment that includes accelerating the industrial vehicle. A next sequential segment is to navigate the industrial vehicle to the rack location where the load resides. A next segment is picking the load from the start location, and a further segment is traveling to the destination area. Then, a next segment is depositing the load at the destination location.

Further, each segment described above can be segmented further. In an illustrative example, the "picking the load" segment includes a start segment that is defined as occurring when the industrial vehicle arrives at the rack and stops. A next segment is raising the forks of the industrial vehicle to a proper height to pick the load, and a next segment is to extend the forks to engage the load. A further segment is to raise the forks slightly to elevate the load from the rack. Further still, a next segment is to retract the forks to allow clearance for the load to be lowered. The next segment is to lower the forks, and the end segment terminates when the forks are fully lowered.

As another example, a task is defined as a put-away operation, e.g., to move a pallet from a receiving lane in a warehouse, to a specified rack location within the warehouse, or to move the pallet from one rack location to another rack location. Here, an example of segmenting the task is to break down the put-away into sequential segments, such as: start at the load initial location; drive and raise the forks (if necessary) to initial location (an inbound slot, a rack location, a receiving lane, etc.); pivot, if necessary; traverse in; account for slot interaction time; pick up load; traverse out; travel to the destination location; raise forks to the rack slot of the destination location; pivot, if necessary; traverse in; account for slot interaction time at the destination location; place load at destination location; traverse out.

In this manner, an entire working shift can be decomposed into a sequential series of tasks, each task subdivided into one or more segments. In an example where there are serial tasks, the end segment of one task can be the same as the start segment of another task. For example, in a picking operation, an experienced operator can be able to start raising the forks of the industrial vehicle while the vehicle approaches the pallet location using a blending function to blend the two actions (e.g., maneuvering and raising the forks). As such, the blending segment can be the end segment of a driving task and the start segment of a picking task or a placing task. As another example, the end segment of one task can be adjacent to the start segment of a next task.

The above examples are presented by way of illustration and not by way of limitation. Other tasks and segments can be defined, the exact nature of which will depend for instance, upon the specific application.

Tasks can be segmented anywhere (e.g., at a server, such as the industrial vehicle application server 14, at the industrial vehicle 12, etc.). Further, the task does not need to be segmented by the same entity or device that defined the task. For example, the task can be defined on a server computer. The tasks are communicated to the information linking device 38, which can be used to collect industrial vehicle data, organized into segments at the industrial vehicle. This data can be then communicated back to the server.

In another example, the industrial vehicle 12 is agnostic to the definition of the tasks. For instance, the information linking device 38 collects industrial vehicle data and communicates the collected data back to the information server 14. The information server 14 parses the received information to extract the data necessary to process the data against the defined tasks. The association of data to tasks is defined in greater detail below.

Method of Evaluating an Industrial Vehicle

Figure 3:
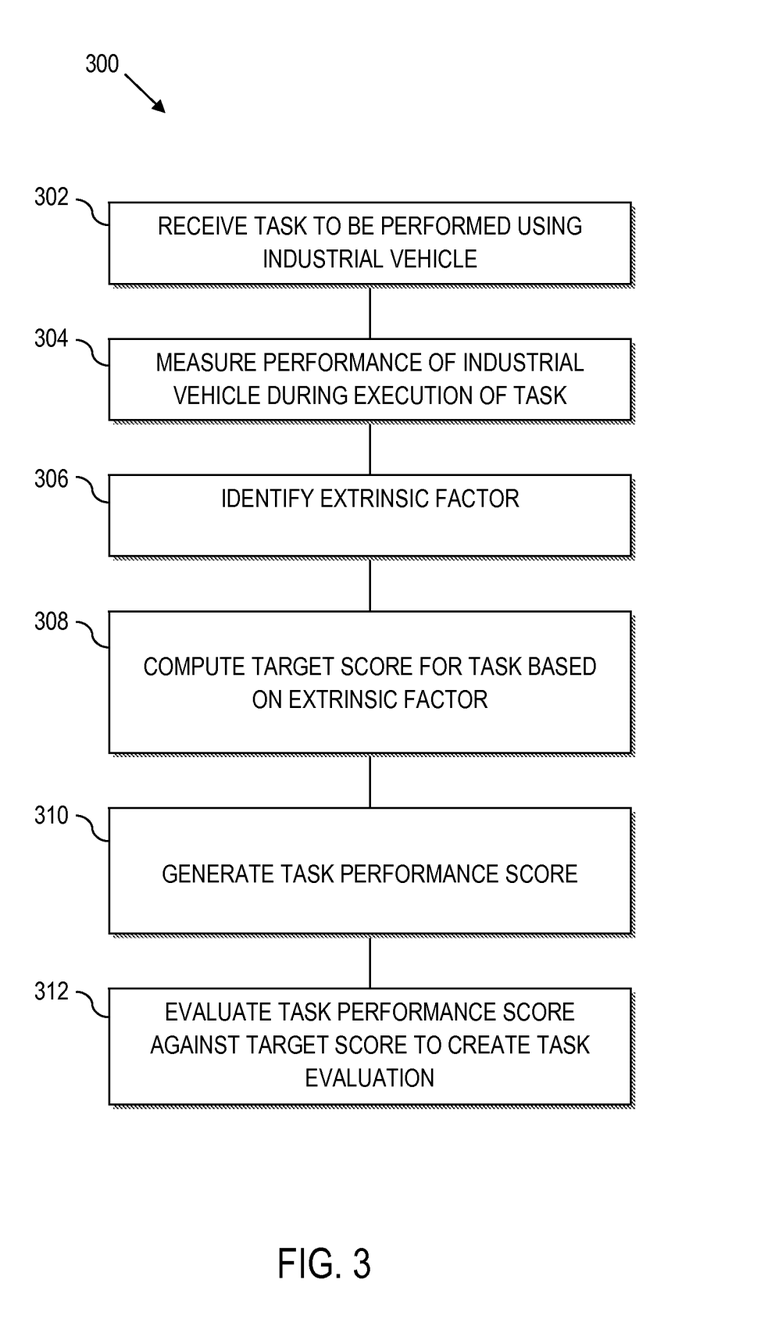
FIG. 3 is a flow chart illustrating a method according to various aspects of the present disclosure.

Referring now to FIG. 3, a flow chart illustrates a computer-implemented method 300 of evaluating the performance of an industrial vehicle. Notably, the method 300 can be implemented at the server computer, e.g., the server 14 of FIG. 1. Alternatively, the method 300 can be implemented on the industrial vehicle 12 itself, e.g., by executing the method 300 on the processor within the control module 204 of the information linking device 38.

At 302, the method receives a task to be performed. In an example implementation, the method 300 receives into memory (e.g., memory in the control module 204 of the information linking device 38), information designating a task to be performed using an industrial vehicle (e.g., the industrial vehicle 12 to which the information linking device 38 is attached). As noted above, the task can include segments. Moreover, the information designating the task includes metrics associated therewith.

At 304, the method measures performance of the industrial vehicle during execution of the segments of the task (or the task itself where no segments are defined) based upon the metrics associated with the task. In an example implementation, the method measures performance at 304 by extracting vehicle operational data that is generated on the industrial vehicle in response to the industrial vehicle executing the segments of the task. The extracted vehicle operational data is responsive to at least one metric. The collected data is thus correlated to the actions defined by the task or task segment.

Thus for instance, the method can extract vehicle operational data that is generated on the industrial vehicle in response to the industrial vehicle executing the segments of the task, by identifying vehicle actions required to perform each segment of the task, and by identifying particular vehicle data that characterizes vehicle performance corresponding to each vehicle action.

By way of illustration, acceleration sensors, motor controllers, and other vehicle electronics on the industrial vehicle are monitored to determine that the industrial vehicle is moving/accelerating. Other sensors (e.g., gyroscopes, cameras, current sensors, etc.) can indicate other measurable operations (e.g., direction, position within the warehouse, energy used, etc.) of the industrial vehicle 12. Also, information collected across the vehicle network system (e.g., CAN bus) can be used measure vehicle performance. For instance, a device such as the information linking device 38 can communicate across the vehicle network system 214 to controllers, modules, etc., 216 (see FIG. 2) to collect vehicle operational data tied to the metrics of the associated tasks that are performed by the industrial vehicle.

The association of vehicle data as a measure of vehicle performance, to an assigned task or task segment, can be implemented for instance, my using a mapping function. Take for example, the task (or task segment) of "raising the forks". During an operation where an industrial vehicle actually raises its forks, a processor, e.g., the information linking device 38 is able to detect that the hydraulics controller was activated to raise the forks. The information linking device 38 or other processor is also be able to detect the weight on the forks, e.g., by reading a load scale. Other measurements characterizing the action of "raising the forks" can include detecting a height of the forks using a height sensor, and recording the time it took to raise the forks. By assembling the above-vehicle data, the method assess the vehicle performance in implementing the "raising the forks" task (or task segment).

In assessing vehicle performance, some or all of the above-information can be extracted via monitoring or otherwise communicating across the vehicle network system (e.g., CAN bus). As an illustration, when the hydraulics of the industrial vehicle is activated, there is a communication on the vehicle network bus that can be deciphered as the forks being raised. In another example, an accelerometer can communicate over the vehicle network bus. A certain reading of the accelerometer (and possibly other components) can indicate that an impact has occurred. That impact can be relevant to a task of driving the industrial vehicle around a corner by way of example.

If the communication is determined to be relevant to the task, then that relevant communication is stored in memory. In an example implementation, the communication is stored in memory on the industrial vehicle (e.g., dedicated memory for such a purpose, memory within the vehicle network bus master, etc.). In an alternative implementation or additionally, the relevant communication is sent to a memory separate from the industrial vehicle (e.g., the information server 14 of FIG. 2). Also, data can be extracted from the industrial vehicle by polling or querying components, e.g., by communicating requests for vehicle data across the vehicle network system.

In an alternate embodiment, vehicle data is sent to a remote server before determining if the communication is relevant. In such cases, the determination of whether the vehicle data is relevant is performed by the remote server (or some other device). In yet another example, the information linking device 38 is programmed to collect certain types of information. The information server 14 can poll the information linking device 38 for that information, or the information server 14 can receive the information via a push from the information linking device 38. Still further, the information linking device 38 can collect, archive, aggregate, etc., relevant vehicle data recorded over time so that the information server 14 receives a history of industrial vehicle data, every few minutes, every hour, every shift, every day, etc. As yet a further example, the industrial vehicle can circulate the current vehicle operating state across the vehicle network system as a recurring, cyclical message. This message is read out and forwarded to the server computer. In this example, the server harvests the collected data to construct the necessary information to assess vehicle performance.

The communications are sent off of the industrial vehicle in any practical manner. For example, if the industrial vehicle includes an information linking device (38 of FIG. 2), then the communication is transmitted to a server using a transceiver associated with the information linking device 38. As another example, a cellular radio can be utilized to transmit vehicle information to a remote device, e.g., a remote server.

At 306, the method receives information identifying an extrinsic factor (which can be external to the industrial vehicle). In an example implementation, the extrinsic factor is in effect at least one time during performance of the task, and is capable of impacting a performance capability of the industrial vehicle in performing the task. Keeping with the above-example, an extrinsic factor is received in to memory of the information linking device 38. In an alternative example, the extrinsic factor is received into memory of the server 14 or some other processing device.

In a further example implementation, receiving into memory, information identifying an extrinsic factor further comprises at least one of: receiving the extrinsic factor from a central server that has information about an environment in which the task is being performed; and performing a select one of monitoring a vehicle network bus of the industrial vehicle for communications from a component attached to the vehicle network bus that detects the extrinsic factor, and querying a component of the industrial vehicle across the vehicle network bus from a device mounted on the industrial vehicle; and receiving the extrinsic factor from an operator logon device that includes information about an operator logged on to the industrial vehicle.

As will be described in greater detail herein, an extrinsic factor can include data indicative that an industrial vehicle must travel through and end of aisle that requires the industrial vehicle to stop in order to complete a task. Other examples of an extrinsic factor include information indicative of the fact that a task requires an industrial vehicle to travel down a particularly congested aisle during the specific execution of a corresponding task. Other extrinsic factors can be utilized, examples of which are set out herein.

At 308, a target score is computed for the task. In general, a target is defined, which represents an "ideal performance", i.e., a performance of the task if performed by an ideal operator. According to various aspects of the present disclosure, the ideal performance can be measured in various ways. In a first example, the ideal performance is determined based upon the particular industrial vehicle as operated by a hypothetical ideal operator. In another example, the ideal performance is determined based upon a new industrial vehicle with a new battery. In yet another example, the ideal performance is based upon the particular industrial vehicle as operated by a hypothetical average operator (thus allowing operators to possibly exceed the target score).

In an example implementation, computing a target score for the task based on an extrinsic factor comprises computing an ideal performance of the task and adjusting the ideal performance based upon the extrinsic factor that is in effect at least one time during the performance of the task. Moreover, computing an ideal performance of the task can comprise a select one of: computing the ideal performance based upon a hypothetical new industrial vehicle using a brand new battery that performs the task, and computing the ideal performance based upon the current state of the actual industrial vehicle.

According to further aspects of the present disclosure, the target score is based on (e.g., factors in) the extrinsic factor that is in effect at least once during performance of the task. In an example implementation, extrinsic factors can be anything that is out of the control of an operator of the industrial vehicle, e.g., congested aisle, end of aisle stop, speed zone, rack height, etc. In example implementations, an extrinsic factor is selected that can impact a performance capability of the industrial vehicle in performing the task.

In yet a further illustrative example, an extrinsic factor includes information about an environment in which the task is being performed. For instance, extrinsic factors can include a factor indicative of traffic congestion in the area where the industrial vehicle is being operated thus slowing down the industrial vehicle, data indicating that the vehicle must go to a secured area and can thus require a delay to obtain clearance, data indicating that the vehicle must go to a refrigerated/frozen area, data indicating the vehicle must be operated in a speed restricted lane, or stop at an intersection, etc.

In further examples, extrinsic information includes information about an operating state of the industrial vehicle. For instance, extrinsic information can factor in an observation that the vehicle is in a "limp mode" due to a low battery. Extrinsic information can also include the type or age of vehicle or vehicle battery, service history, error codes or wear conditions of the vehicle, whether the vehicle has a load. Thus, the mechanical state/wear/age of the particular industrial vehicle can be directly accounted for in determining the performance of the industrial vehicle.

In further examples, extrinsic factors include factors such as operator information or actions within an operator's control. For instance, an operator classification or status can reduce functionality of the industrial vehicle. Extrinsic factors can even factor in information such as whether the operator has an assigned break during a task, etc.

Yet further, extrinsic factors can be derived from one or more sources. For example, a server can keep track of other vehicles' movements in an area to figure out traffic congestion, an operator login device on an industrial vehicle can provide operator identification, a battery monitor of the industrial vehicle can track vehicle charge (e.g., to indicate that the vehicle is in a limp mode, or low power state, due to low battery charge) etc. All examples of extrinsic factors (and other examples in general) are non-limiting examples that are provided for clarity and understanding.

In an illustrative example, an ideal model is used to determine an ideal target score for an associated task. The score can be factored in any desired measure. For instance, the score can be based upon time, energy usage, dollar value, etc. One or more specific extrinsic factors are taken into account to correct the ideal target score to a target score for the specific industrial vehicle, performing a specific task in a specific environment and/or based upon other operating conditions. Further, the type of task can also help determine the target score for the task.

By way of example, knowing the maximum travel speeds of an industrial vehicle, the method can compute how long the industrial vehicle should take to travel down an aisle. However, extrinsic evidence can suggest for instance, that there is a speed restriction in the aisle. The speed restriction can be permanent or temporary, e.g., due to a spill in the floor, detected congestion, etc. Accordingly, the score is adjusted to account for the realities of the situation involved in completing the task. For instance, increased time can be factored into the target score, etc.

According to further aspects of the present disclosure, more than one target score can be defined for a single task. For example, there can be separate target scores regarding performance (e.g., proper performance of the task within the guidelines of a warehouse operation), productivity, energy consumed, etc. These individual scores can be aggregated into an overall score. This allows the warehouse manager an ability to fine-tune vehicle performance assessments. As an example, the warehouse manager may be willing to allow additional time per task, thus sacrificing productivity, in order to nurture the proper operator behavior of stopping at intersections, respecting lane speed restrictions, etc. Thus, if a facility is more concerned about performance than productivity, then the target score for performance can be weighted appropriately against a target score for productivity. Moreover, where multiple target scores are provided for a given task, the target scores can be aggregated up into an overall target score.

Also, the target score can be computed at any time. For example, the target score can be computed before the task has started, after the task has completed, while the task is being completed, or combinations thereof. As such, it is possible for the target score to be recomputed/adjusted as extrinsic factors occur or are otherwise detected. For example, if a performance target score is defined before the task starts (e.g., a target score defined using the extrinsic factor of environment of a freezer) and another extrinsic factor occurs (e.g., there is heavy traffic congestion in the freezer), then the performance target score can be adjusted to allow for more time to compensate for the heavy traffic congestion.

Further, the target score can be defined as a threshold or a series of thresholds (i.e., a scale). For example, the target score can include five separate thresholds (e.g., trainee, novice, intermediate, expert, and master). Of course, other levels can be used, e.g., a scale of 1-10, a score of up to 100%, etc. In this regard, computing a target score for the task based on an extrinsic factor can further comprise creating a scale with multiple thresholds for the target score. Here, evaluating the task performance score against the target score for the task further comprises determining a range of the scale in which the performance falls as the task evaluation.

Note that these target thresholds are different than classifications of an operator. For example, an operator can be classified as a level-2 operator as far as general operation is concerned. This operator classification may or may not impact performance tuning of the vehicle to the skill level of the operator. When the operator logs onto the industrial vehicle, information about the identification of the operator is communicated to the mechanism defining the target score. The operator identification (being an example of an extrinsic factor as mentioned above) can be used to define or otherwise adjust or modify the five (or any number of) thresholds of the target. This allows the system to account for the skill of the operator in assessing a score for the operator.

In this regard, an evaluation can be performed, and a score can be assessed on a task-by-task basis. As an example, an operator classified as a level-2 operator can score for a given task, an "expert" at conserving energy, but an "intermediate" at productivity.

In another example, scores across a plurality of tasks can be aggregated into an overall score. Thus, a daily, monthly, or other interval can be used to aggregate and compute an overall score for the operator, where each measure is dynamically compensated based upon the specific conditions associated with the event.

Moreover, the task evaluation, e.g., via the task performance score, can be used to modify an industrial vehicle operator performance rating associated with the operator of the industrial vehicle. In this manner, the industrial vehicle can wirelessly receive the operator performance rating. In response thereto, a processor on the industrial vehicle carries out performance tuning, i.e., uses the operator performance rating to modify the performance of the industrial vehicle.

This can be done by modifying set points, setting maximum travel speed, modifying the rate at which the forks of a forklift can be raised/lowered, restricting the load that the industrial vehicle can carry, modifying locations that the industrial vehicle is allowed to travel, etc.

Further, "segment targets" can be defined (along with computed "segment target scores") for individual segments of a task in the same way that targets can be defined for the complete task. In cases with multiple targets or multiple segment targets, each target or segment target can be separate from the others, or the various targets and segment targets can be aggregated, etc.

The target can be defined anywhere (e.g., at a server, at the industrial vehicle, etc.). Further, the target does not need to be defined by the same entity or computing device that defined the task or segmented the task. For example, the target can be defined on a server but segmented at the industrial vehicle. In cases with a group of tasks that are performed, the tasks can be treated separately as having their own targets or can be combined to have targets for the combination of tasks.

As yet a further example, computing a target score for the task based on an extrinsic factor can further comprise defining a first target for the task based on the extrinsic factor, defining a second target for the task based on the extrinsic factor, computing a first target score for the task based on the extrinsic factor, and computing a second target score for the task based on the extrinsic factor. Here, evaluating the task performance score against the target score for the task further comprise evaluating the task performance score against the first target score for the task to create a first evaluation for the task, and evaluating the task performance score against the second target score for the task to create a second ion for the task.

Also, computing a target score for the task based on an extrinsic factor can further comprise modifying the target score after the target score has been computed. Computing a target score for the task based on an extrinsic factor can also further comprise computing a target score for the task by factoring out any extrinsic factors that are out of an operator's control. Here, evaluating the task performance score against the target score for the task to create a task evaluation further comprises at least one of: evaluating the task performance score against the target score to determine an operator's performance as the task evaluation, and evaluating the task performance score against the target score to determine an group of operators' performance as the task evaluation.

At 310, the method generates a task performance score based upon the measured performance of the industrial vehicle in performing the task. In an example implementation, the measured performances are optionally aggregated (e.g., if segments are defined for the given task) to create a task performance score. For example, a task performance score can be computed using at least a portion of the vehicle data collected during performance of the task. The task performance score can be computed in a manner identical to or analogous to the manner in which the target score is computed, except that actual (not ideal) vehicle performance is utilized.

As an example, if the target is a productivity target of time, then the times to perform each segment of the task are added together to give an overall time taken to complete the task. As another example, if the target is a performance target, then a performance evaluation is made for each segment of the task (e.g., number of impacts, did the vehicle come to a complete stop at intersections, were turns taken at an acceptable radius, was enough time allowed for a smooth braking when stopping, etc.), was a geofence location properly avoided, etc. The performance measures at each segment can be combined to create a task performance score.

If there is more than one target for a given task, then more than one task performance score can be calculated. For example, if there is both a performance target and a productivity target (combining the examples from the previous paragraph above) for one task, then two task results can be calculated.

At 312, the task performance score from 310 is evaluated against the target score to create a task evaluation. The evaluation of the task performance score against the target score for the task can further comprise evaluating the task performance score against the target score for the task (e.g., on the fly) using a processor on the industrial vehicle.

The task evaluation can be stored, aggregated with other recorded values, etc. In an example implementation, the task evaluation is displayed to an operator, manager, etc. If there is more than one target, then each task can be evaluated to create two different task evaluations. In an example implementation, these two task evaluations are displayed separately (e.g., novice at productivity, intermediate at energy) or combined to get one overall task evaluation (e.g., beginner at the task).

Further, if segment targets are utilized to evaluate subcomponents of a given task, then segment evaluations are created in a manner analogous to that described more fully herein.

The evaluations can be performed on the vehicle itself, on a server, or any other suitable evaluator. Wherever the evaluation takes place, the evaluator should have information needed to make or otherwise present the evaluation (e.g., tasks, segments, targets, task performance, etc.) whether that information was collected on the evaluator, received by the evaluator, or both.

In cases with multiple tasks, there can be one evaluation for all of the tasks together by combining the evaluations or there can be one or more evaluations for each task reported separately.

By re-computing target score(s) as the task is being performed or computing a target score after completing the task, the evaluation can be made by factoring/accounting for elements that are out of the operator's control. Thus, the evaluation can be made for the industrial vehicle itself or the evaluation can be applied to a specific operator. Further, an evaluation can be made for a group of operators without singling out any one specific operator.

In example implementations, the resulting task evaluations are compared to other historical evaluations stored in a local database or a remote database. Further, in yet another example implementation, a remote global database is generated for a comparison that keeps evaluations across many facilities, possibly facilities not associated with each other (e.g., different users in different markets, etc.). This global database can be used for comparisons as described above, but also can be used to determine that some tasks may need to be improved in certain facilities. In these cases, a study can be implemented to determine that by spending money on a change in layout of the facility, the return on investment is short, by better operator training, maintenance cost can be reduced, etc. Thus, the method can provide recommendations based on comparing the evaluations for improvements.

Also, the method can provide feedback to an operator on how to improve evaluations to the targets.

Figure 4:
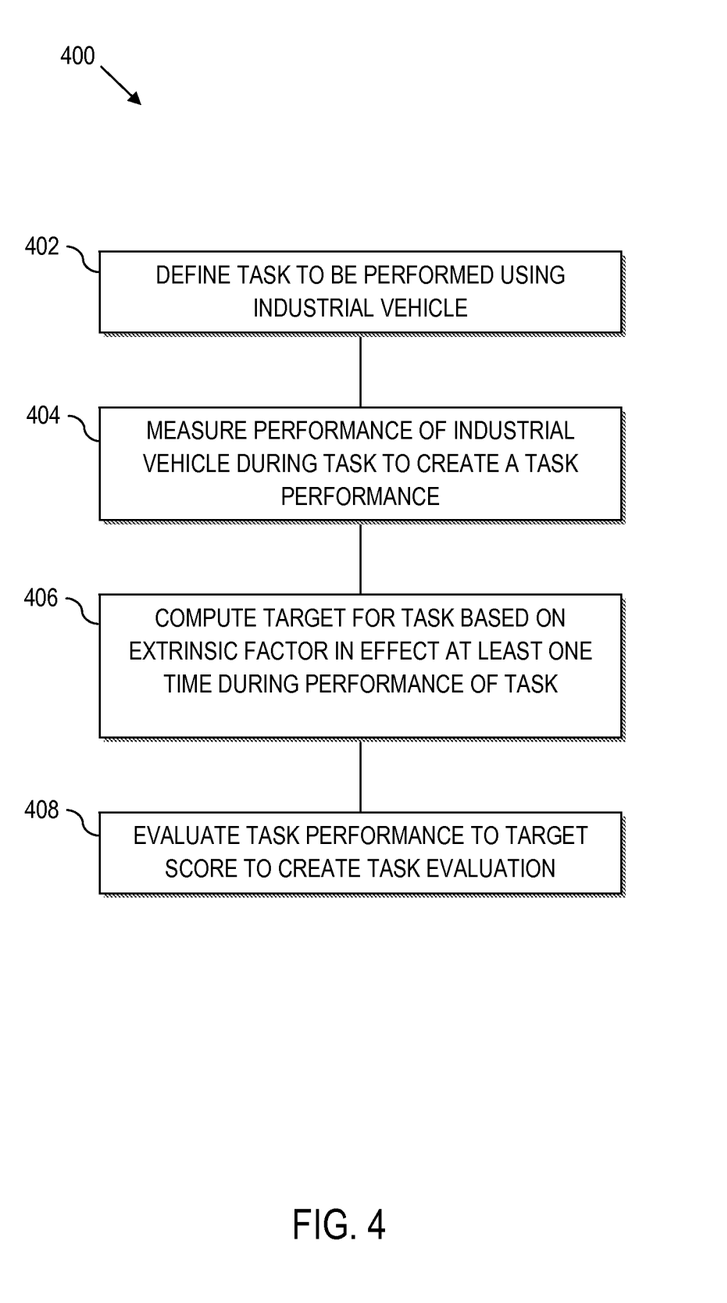
FIG. 4 is a flow chart illustrating a method according to various aspects of the present disclosure.

Referring now to FIG. 4, a method 400 is disclosed similar to the method of FIG. 3 without segmenting the task.

In this regard, the method 400 can be implemented at the server computer, e.g., the server 14 of FIG. 1. Alternatively, the method 400 can be implemented on the industrial vehicle 12 itself, e.g., by executing the method 400 on the processor within the control module 204 of the information linking device 38.

In general, the method 400 comprises defining, at 402, a task to be performed using an industrial vehicle. Here, the definition of a task is analogous to that set out in greater detail herein.

At 404, the method measures performance of the industrial vehicle during execution of the task, to create a task performance. Again, methods of measuring industrial vehicle performance are set out in greater detail herein, e.g., by associating metrics with the task, collecting vehicle data indicative of the vehicle's performance of the task based upon data associated the metrics, etc.

At 406, the method comprises computing a target score for the task based upon one or more extrinsic factors in effect at least at one time during the execution of the task. The target score here is analogous to the target score described with reference to FIG. 3.

At 408, the method evaluates the measured task performance against the target score to create/compute a task evaluation. The task evaluation is analogous to the task evaluation discussed above with reference to FIG. 3.

Miscellaneous:

As noted more fully herein, the systems and methods are capable of monitoring and measuring industrial vehicle data (vehicle performance/vehicle operational data) at a relatively high level, e.g., acceleration, braking, speed, lift, etc. In other implementations, finer resolution of data can be accounted for, such as lift weight, blending, whether semi-automation or location tracking capabilities are utilized, etc. Also, fine details can be recorded. For instance, in a blending operation, the timing of when the operator engaged the blending as a function of progress in the task can be assessed.

Moreover, opportunities are available to change the focus of the target score and task performance score. For instance, the scores can be measured in time, dollars, energy, etc. As such, if a warehouse manager notes that the performance of a task cost too much money compared to the target score, the manager can use the data to trace back the root cause of the deviation from the target score. It may turn out that the root cause was delays in travel time and lift time due to a weak battery. This can be used to schedule better battery management and battery replacement strategies. That is, the systems and methods herein can be used to identify the vehicle components that are the root cause of deviation from the target scores, thus improving overall operation of the industrial vehicles.

Also, as noted in greater detail herein, depending upon how the target score is defined, it is possible for a task to achieve above the target score, thus representing an increase in task performance over the "ideal".

Still further, the systems and methods herein can be used to compare actual performance compared to defined "ideal" performance for not only the industrial vehicles, but also the operators themselves.

According to further aspects of the present disclosure, systems and methods take advantage of knowledge of one or more of the following: rack and warehouse layout; goods being stored in the warehouse (including size and/or weight); tasks to be performed (e.g., from a warehouse management system (WMS); defined metrics; industrial vehicle performance; industrial vehicle location during operation (if location tracking services are available); environmental conditions; when tasks begin and end. This information is utilized to implement the methods of FIG. 3 and/or FIG. 4.

According to yet further aspects here, because the beginning and ending of each task is known or determinable, the dynamic task score can be assessed and displayed at the completion of the task where desired. Alternatively information can be conveyed at other convenient times.

Also, where multiple measures are provided, e.g., productivity, energy, etc., unique scores and weights can be defined, even down to the operator-specific level. For instance, certain operators, e.g., operating vehicles performing heavy lifting, can be weighted more heavily on energy whereas a sit down counterbalance operator can be weighted more heavily towards productivity. This can be used to balance desired operator behavior.

Moreover, vehicle operators can receive dynamic feedback during a shift, based upon how the operator score fluctuates as tasks are performed. For instance, affirmations, training, and negative feedback can be provided to allow the operator to assess their performance in real-time. For instance, all productivity measures collected over a shift can be aggregated into a final score. However, as that score develops over the shift, real-time feedback on performance can be delivered to the operator via the display on the industrial vehicle. The analogous approach can be used for energy measures, performance measures, etc. Thus, the systems and methods herein can be used to implement a real-time task tracker with task evaluations fed back to the operator.

By collecting data from several different "views" the systems and methods herein can serve as a return on investment estimator that can be used to evaluate changes made to equipment, warehouse policy, etc. As another example, warehouse managers can gain insight into the impact of changes. For instance, a warehouse policy to change a procedure can be evaluated into dollars, energy, time, etc. Moreover the industrial vehicle components that drive the change (e.g., improvement, detriment, etc.) can be identified.

Figure 5:
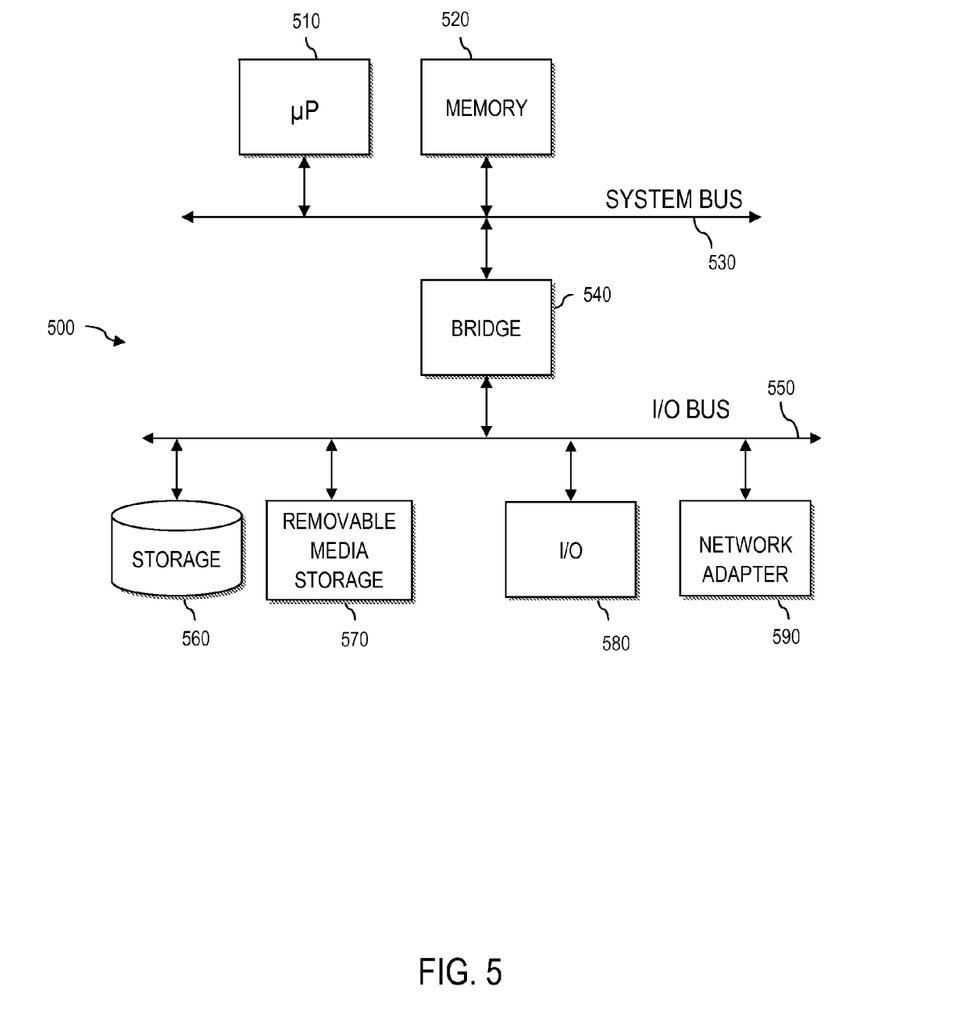
FIG. 5 is a diagram illustrating a computer system for executing computer-readable program code, according to various aspects of the present disclosure.

Referring to FIG. 5, a schematic of an exemplary computer system having computer readable program code for executing aspects described herein with regard to the preceding FIGURES. The computer system can be in the server computer 14, the information linking device 38, the battery monitor 44, combinations thereof, etc.

The computer system 500 includes one or more microprocessors 510 that are connected to memory 520 via a system bus 530. A bridge 540 connects the system bus 530 to an I/O Bus 550 that links peripheral devices to the microprocessor(s) 510. Peripherals can include storage 560, such as a hard drive, removable media storage 570, e.g., floppy, flash, CD and/or DVD drive, I/O device(s) 580 such as a keyboard, mouse, etc. and a network adapter 590. The memory 520, storage 560, removable media insertable into the removable media storage 570 or combinations thereof, implement computer-readable hardware that stores machine-executable program code for implementing the methods, configurations, interfaces and other aspects set out and described herein.

Still further, the exemplary computer system can be implemented as an apparatus for dynamically assessing performance data measured during the operation of industrial vehicles. The computer system can comprise a processor (e.g., microprocessor 510) coupled to a memory (e.g., memory 520, storage 560, removable media insertable into the removable media storage 570 or combinations thereof), wherein the processor is programmed to normalize industrial vehicle performance data by executing program code to perform one or more of the methods set out herein.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device, e.g., the system described with reference to FIG. 5. Thus, a computer readable storage medium, as used herein, is not to be construed as being transitory signals per se, such as radio waves or other freely propagating electromagnetic waves through a transmission media.

Computer readable program instructions described herein can be downloaded to respective computing/processing devices from a computer readable storage medium or to an external computer or external storage device via a network, for example, the Internet, a local area network, a wide area network and/or a wireless network.

Aspects of the present disclosure are described herein with reference to flowchart illustrations and/or block diagrams. Each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. In some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions can also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method of evaluating of industrial vehicle performance, comprising:
   receiving into memory, information designating a task to be performed using an industrial vehicle, the task including segments, and having metrics associated therewith;
   measuring, by a processor on the industrial vehicle, performance of the industrial vehicle during execution of the segments of the task based upon the metrics associated with the task, by:
      extracting, by the processor on the industrial vehicle, vehicle operational data that is generated on the industrial vehicle in response to the industrial vehicle executing the segments of the task, the extracted vehicle operational data being responsive to at least one metric;
   receiving into memory, information identifying an extrinsic factor, the extrinsic factor being in effect at least one time during performance of the task, and being capable of impacting a performance capability of the industrial vehicle in performing the task;
   computing, by the processor on the industrial vehicle, a target score for the task based on the extrinsic factor;
   generating, by the processor on the industrial vehicle, a task performance score based upon the measured performance of the industrial vehicle in performing the task; and
   evaluating, by the processor on the industrial vehicle, the task performance score against the target score for the task to create a task evaluation, the task evaluation indicative of industrial vehicle performance.

2. The method of claim 1, wherein receiving into memory, information designating a task comprises a select one of:
   defining a pick operation wherein the industrial vehicle must maneuver from a start location to a bin location and retrieve a load; and
   defining a put-away operation wherein the industrial vehicle must maneuver a load from a start location to an end location to place a load.

3. The method of claim 1, wherein:
   extracting vehicle operational data that is generated on the industrial vehicle in response to the industrial vehicle executing the segments of the task, comprises identifying vehicle actions required to perform each segment of the task, and identifying particular vehicle data that characterizes vehicle performance corresponding to each vehicle action; and extracting vehicle operational data comprises extracting the identified particular vehicle data.

4. The method of claim 1, wherein measuring performance of the industrial vehicle further comprises:

extracting information communicated across a vehicle network bus of the industrial vehicle that has been correlated to at least one metric associated with the task, such that:

information is extracted by performing at least one of:
monitoring the vehicle network bus of the industrial vehicle for communications from components attached to the vehicle network bus and extracting information correlated to at least one metric from communications that are determined to be relevant to the industrial vehicle executing the task; and querying components attached to the vehicle network bus for information correlated to at least one metric and which is determined to be relevant to the industrial vehicle executing the task.

5. The method of claim 1, wherein receiving into memory, information identifying an extrinsic factor further comprises at least one of:

receiving the extrinsic factor from a central server that has information about an environment in which the task is being performed;

performing a select one of monitoring a vehicle network bus of the industrial vehicle for communications from a component attached to the vehicle network bus that detects the extrinsic factor, and querying a component of the industrial vehicle across the vehicle network bus from a device mounted on the industrial vehicle; and receiving the extrinsic factor from an operator logon device that includes information about an operator logged on to the industrial vehicle.

6. The method of claim 1, wherein computing a target score for the task based on an extrinsic factor comprises:
computing an ideal performance of the task; and
adjusting the ideal performance based upon the extrinsic factor that is in effect at least one time during the performance of the task.

7. The method of claim 6, wherein computing an ideal performance of the task comprises a select one of:
computing the ideal performance based upon a hypothetical new industrial vehicle using a brand new battery that performs the task; and
computing the ideal performance based upon a current state the of the actual industrial vehicle.

8. The method of claim 1, wherein computing a target score for the task based on an extrinsic factor further comprises at least one of:
computing a target score for the task based on an operating state of the industrial vehicle;
computing a target score for the task based on an environment in which the industrial vehicle is performing the task; and
computing a target score for the task based on an operator identification.

9. The method of claim 1, wherein computing a target score for the task based on an extrinsic factor further comprises:
computing a target score for the task based on more than one extrinsic factor, where the extrinsic factor is any combination of an operating state of the industrial vehicle, an environment in which the industrial vehicle is performing the task, and an operator identification.

10. The method of claim 1, wherein:
computing a target score for the task based on an extrinsic factor further comprises:
defining a first target for the task based on the extrinsic factor;
defining a second target for the task based on the extrinsic factor;
computing a first target score for the task based on the extrinsic factor; and
computing a second target score for the task based on the extrinsic factor; and
evaluating the task performance score against the target score for the task further comprises:
evaluating the task performance score against the first target score for the task to create a first evaluation for the task; and
evaluating the task performance score against the second target score for the task to create a second evaluation for the task.

11. The method of claim 1, wherein:
computing a target score for the task based on an extrinsic factor further comprises defining a scale having multiple thresholds, each successive one of the multiple thresholds defining a higher score on the scale; and
evaluating the task performance score against the target score for the task further comprises scoring an operator's performance of the task to a select one of the multiple thresholds of the scale.

12. The method of claim 1, wherein computing a target score for the task based on an extrinsic factor further comprises modifying the target score after the target score has been computed.

13. The method of claim 1, wherein:
computing a target score for the task based on an extrinsic factor further comprises computing a target score for the task by factoring out any extrinsic factors that are out of an operator's control; and
evaluating the task performance score against the target score for the task to create a task evaluation further comprises at least one of:
evaluating the task performance score against the target score to determine an operator's performance as the task evaluation; and
evaluating the task performance score against the target score to determine a group of operators' performance as the task evaluation.

14. The method of claim 1, wherein:
evaluating the task performance score against the target score for the task further comprises evaluating the task performance score against the target score as the task is being performed by the processor on the industrial vehicle.

15. The method of claim 1 further comprising:
defining a segment target score for each segment based on an extrinsic factor that is in effect at least one time during performance of the segment; and
evaluating a segment performance against the segment target score to create a segment evaluation.

16. The method of claim 1, wherein measuring performance of the industrial vehicle during the segments further comprises:
receiving the performance of the industrial vehicle during the segments on a server; and evaluating the task performance score against the target score for the task to create a task evaluation occurs on the server.

17. The method of claim 1, wherein evaluating the task performance score against the target score for the task to create a task evaluation occurs while the task is being completed.

18. The method of claim 1 further comprising:
defining the task to be performed by defining a group of tasks to be performed using the industrial vehicle;
segmenting each task in the group of tasks by segmenting the group of tasks into groups of segments, each group of segments including a start segment and an end segment;
computing a target score for the task based on an extrinsic factor further comprises computing a target score for each task of the group of tasks;
aggregating the measured performance of the industrial vehicle to create a task performance score further comprises aggregating the measured performance of the industrial vehicle to create a task performance score for each task in the group of tasks;
evaluating the task performance score against the target score for the task to create a task evaluation further comprises evaluating the task performance scores against a corresponding target score for the task to create a group of task evaluations; and
combining the group of task evaluations into a single task evaluation, wherein the end segment of one task of the group of tasks is a beginning segment of another task of the group of tasks.

19. The method of claim 1 further comprising:
comparing the task evaluation against a similar task evaluation stored in a database, wherein the database is a remote database that includes similar task evaluations from independent entities; and
providing recommendations, based on the comparing, for improvements that can be made to the environment in which the task is being performed.

20. The method of claim 1 further comprising:
providing feedback to an operator based on the task evaluation.

21. A computer-implemented method of evaluating industrial vehicle performance, comprising:
receiving into memory accessible by a processor of an industrial vehicle, information designating a task to be performed using the industrial vehicle, where the task has metrics associated therewith;
measuring, by the processor of the industrial vehicle, performance of the industrial vehicle during execution of the task based upon the metrics associated with the task to create a task performance score, by:
extracting, by the processor of the industrial vehicle, vehicle operational data that is generated on the industrial vehicle in response to the industrial vehicle executing the task, wherein the extracted vehicle operational data is responsive to at least one metric;
receiving into memory, information identifying an extrinsic factor that is in effect at least one time during performance of the task, the extrinsic factor designating a factor not related to a performance capability of the industrial vehicle;
computing, by the processor of the industrial vehicle, a target score for the task based on the extrinsic factor that is in effect at least one time during performance of the task;
evaluating, by the processor of the industrial vehicle, the task performance score against the target score for the task to create a task evaluation;
receiving the performance of the industrial vehicle during the task on a server; and
evaluating the task performance score against the target score for the task to create a task evaluation occurs on the server.

22. The method of claim 21, wherein:
defining a task to be performed using an industrial vehicle further comprises defining a group of tasks to be performed using the industrial vehicle;
computing a target score for the task based on an extrinsic factor further includes computing a target score for each task of the group of tasks; and
evaluating the task performance score against the target score for the task to create a task evaluation further includes evaluating the task performance scores to a corresponding target score for the task to create a group of task evaluations;
further comprising:
combining the group of task evaluations into a single task evaluation.

23. The method of claim 21 further comprising:
segmenting the task;
wherein:
collecting vehicle data generated by the industrial vehicle during performance of the task comprises:
collecting vehicle data representing the industrial vehicle performance for each segment of the task;
computing a task performance score using at least a portion of the vehicle data collected during performance of the task, comprises:
aggregating the collected vehicle data collected for each segment of the task.

* * * * *

UNITED STATES PATENT AND TRADEMARK OFFICE
CERTIFICATE OF CORRECTION

PATENT NO. : 9,607,453 B2
APPLICATION NO. : 14/852752
DATED : March 28, 2017
INVENTOR(S) : Philip W. Swift It is certified that error appears in the above-identified patent and that said Letters Patent is hereby corrected as shown below:

In the Specification

In the Description:

Column 11, Line 5, "implemented for instance, my using a mapping function," should read --implemented for instance, by using a mapping function.--

Column 11, Lines 16 and 17, "the method assess the vehicle performance" should read --the method assesses the vehicle performance--

Column 12, Line 30, "must travel through and end of aisle" should read --must travel through an end of aisle--

Column 15, Lines 47 and 48, "target score to determine an group of operators" should read --target score to determine a group of operator--

Column 17, Line 66, "management system (WMS);" should read --management system (WMS));--

In the Claims

Column 20, Lines 24 and 25, "method of evaluating of industrial vehicle performance" should read --method of evaluating industrial vehicle performance--

Column 21, Line 51, "state the of the actual industrial vehicle" should read --state of the actual industrial vehicle--

Signed and Sealed this
Third Day of October, 2017

Joseph Matal
*Performing the Functions and Duties of the*
*Under Secretary of Commerce for Intellectual Property and*
*Director of the United States Patent and Trademark Office*